Figure 1:
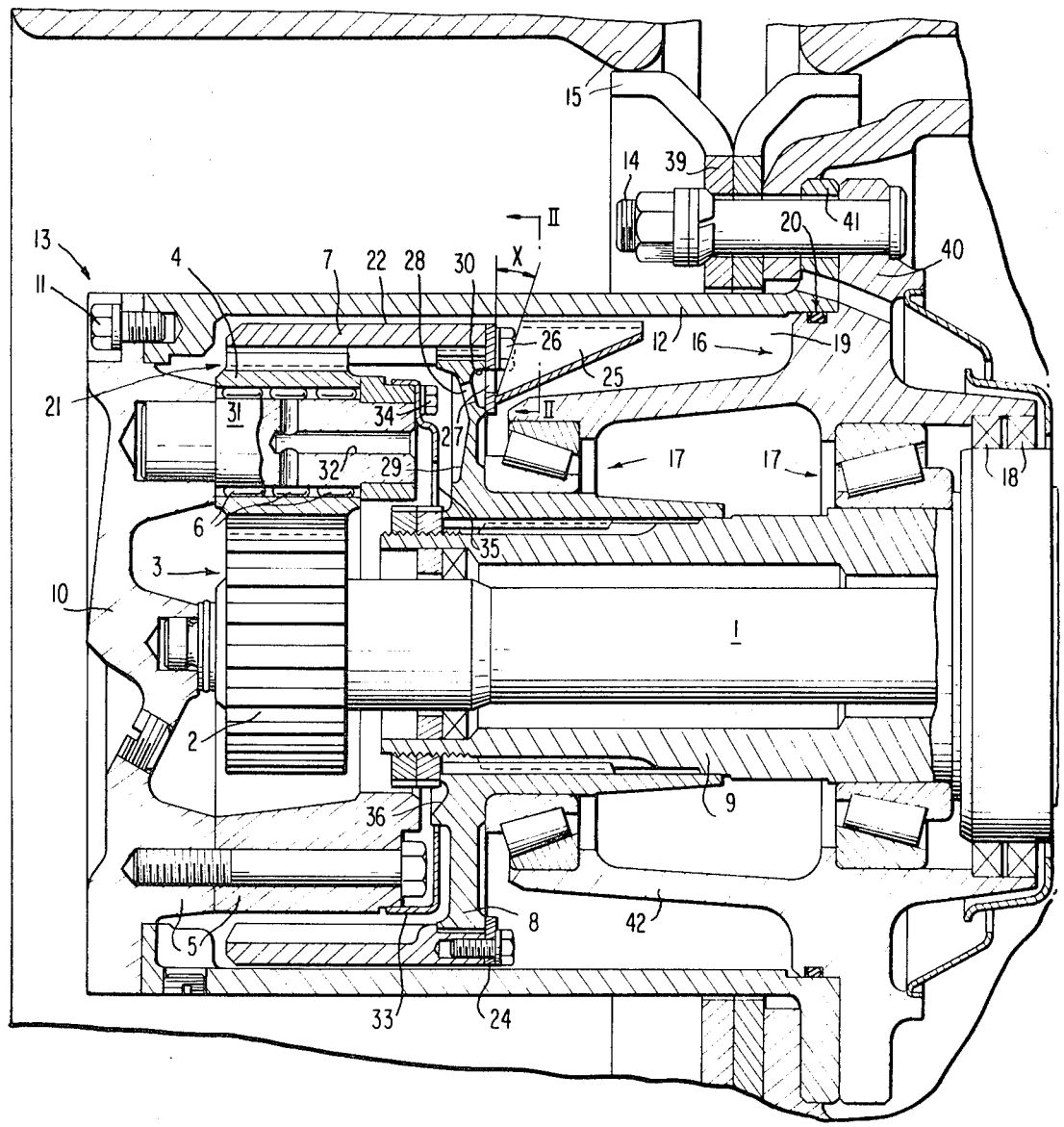

United States Patent

[11] 3,583,526

[72] Inventors Werner Mulleder
 Steyr, Austria;
 Wolfgang Mosig, St. Sebastian, Germany
[21] Appl. No. 773,801
[22] Filed Nov. 6, 1968
[45] Patented June 8, 1971
[73] Assignee Daimler-Benz Aktiengesellschaft
 Stuttgart-Unterturkheim, Germany

[54] AXLE DRIVE, ESPECIALLY FOR MOTOR VEHICLES
 21 Claims, 2 Drawing Figs.
[52] U.S. Cl. .................................................. 184/6,
 74/467
[51] Int. Cl. ........................................... F01m 1/12,
 F16h 57/04
[50] Field of Search ...................................... 184/6, 11;
 74/467, 468

[56] References Cited
 UNITED STATES PATENTS
 2,408,336 9/1946 Orr .............................. 184/6
 2,681,126 6/1954 Searls ........................ 184/6
 3,042,145 7/1962 Bixby ........................ 184/6
 3,429,400 2/1969 Engle et al. .................. 184/11

Primary Examiner—Arthur T. McKeon
Attorney—Craig, Antonelli, Stewart & Hill

ABSTRACT: An axle drive, especially for motor vehicles, in which the half-axle drive shaft is connected with the input member of a planetary gear and the wheel hub of the associated vehicle wheel with the output member thereof; the planetary gear is arranged within an oiltight housing which includes a rotatable housing case driven by the planetary gear; the reaction member of the planetary gear is securely connected within the oiltight housing with a nonrotating part of the axle drive housing; an annular channel is formed within the oiltight housing that is radially limited by the housing case and is constructed spatially separated from the planetary gear; the annular channel is in communication with the radially outwardly and radially inwardly disposed engaging zones of the planetary gear by way of flow passages while the reaction member of the planetary gear or a part securely connected with the same is constructed as guide apparatus for the annular channel; the guide apparatus is provided, on the one hand, with guide blades on the side of the annular channel for producing an approximately centripetal flow component and with guide cross sections on the side of the gear for the deflection of the centripetal flow component in the direction toward the radially inwardly disposed engaging zones of the planetary gear.

PATENTED JUN 8 1971   3,583,526

INVENTORS
WERNER MÜLLEDER
WOLFGANG MOSIG

BY *Craig & Antonelli*
ATTORNEYS

AXLE DRIVE, ESPECIALLY FOR MOTOR VEHICLES

The present invention relates to an axle drive, especially for motor vehicles, in which each half-axle drive shaft is nonrotatably connected with the input member of a respective planetary gear and the wheel hub of the associated vehicle wheel with the output member of the planetary gear, and in which the planetary gear is arranged in an oiltight housing, whereby the housing includes a housing case rotatably driven by the planetary gear assembly and the reaction member of the planetary gear is securely connected within the oiltight housing with a fixed, nonrotatable part of the axle drive housing.

With axle drives of the aforementioned type, the disadvantage arises above predetermined driving velocities that the centrifugal forces acting on the oil filling of the housing for the planetary gear increase to such an extent that the entire lubricating oil is centrifuged radially outwardly against the housing case whereby the lubrication of the planetary gear is interrupted. This phenomenon becomes noticeable in a disturbing manner, depending on the type of vehicle, already at velocities starting with 40 km./hr. so that axle drives of the aforementioned type could be used heretofore only with slow, special types of vehicles.

The present invention aims at eliminating the aforementioned disadvantages and to improve an axle drive of the aforementioned type.

For this purpose, according to the present invention, an annular channel limited or defined by the housing case is formed within the oiltight housing and is constructed spatially separated from the planetary gear and is operatively connected by way of flow passages with the radially outwardly disposed engaging zones of the planetary gear, and the reaction member of the planetary gear and/or the part of the axle drive housing rigidly connected therewith is constructed as guide apparatus for the flow channel whereby the guide apparatus is provided, on the one hand, for the production of an approximately centripetal flow component independent of the direction of rotation of the housing case, with guide blades on the channel side and on the other, for the deflection of the centripetal flow component in the direction toward the radially inwardly disposed engaging zones of the planetary gear, with guide cross sections on the side of the gear.

The lubricating oil is cooled in an advantageous manner by the annular channel provided in accordance with the present invention and is supplied to the engaging zones of the planetary gear in a calm condition by means of the guide apparatus. Furthermore, the advantage is achieved by the present invention that disadvantageous splash work of the oil within the gear area, properly speaking, is avoided by the forced oil circulation from the engaging zones into the annular channel and vice versa.

It is known with an axle drive of the aforementioned type that the reaction member of the planetary gear assembly is nonrotatably connected by way of a flangelike support sleeve with the axle tube of the axle drive housing. According to an advantageous development and construction of the present invention, the annular channel may be arranged on the side of the support sleeve or support bush opposite the planetary gear whereby the support sleeve or bush forms an axial boundary for the annular channel. With this type of construction of the present invention, the support sleeve is provided with flow apertures or passages connecting the annular channel with the engaging zones of the planetary gear; the passages or apertures are each controlled on the side of the support sleeve facing the annular channel by a pair of axially symmetrical guide blades securely connected with the support sleeve. The guide blades conduct an oil stream out of the annular channel in an approximately centripetal direction whereby the symmetrical construction of the guide blades serves for the purpose to assure the efficacy thereof also with flow directions of the oil in the inlet channel alternating in dependence on the forward and backward drive of the vehicle. In order to avoid with this type of construction of the present invention disadvantageous turbulence flows during the deflection of the oil stream, the cross section of the support sleeve or bush is limited within the area of the flow apertures or passages thereof by flow guide surfaces on the transmission side and on the channel side. It is customary with planetary gears for the lubrication of the planet gearwheel bearing supports that axial oil bores are provided in the planet gear carriers. In the application of the present invention to axle drives with planetary gears of this type, a guide installation may be advantageously arranged at the planetary gear carrier within the radial area of the oil bores which deflects a radial component of the oil stream coaxially toward the oil bores. In an advantageous construction of this guide installation, a guide disc is flangedly connected according to the present invention with the planetary gear carrier at the end face thereof which is offset from the planetary gear carrier radially outwardly of the oil bores of the planetary gear carrier in a Z-shaped manner and which covers the oil bores at an axial distance as well as is provided with a concentric passage aperture for the oil stream whereby the guide cross sections at the guide apparatus on the gear side dip or extend into the concentric flow aperture of the guide disc with radial play.

In an advantageous type of construction of the guide blades, the latter possess according to the present invention an unequalsided angular profile tapering in cross section, whose longer leg is curved in the direction toward the shorter leg with two guide blades each symmetrically placed against one another with the shorter legs thereof in the assembled position whereby, on the one hand, the profile ends of the same types of legs are disposed on similar flow radii of the annular channel whereas, on the other, the common profile edge of the two legs of a guide blade forms an acute angle with the axis of rotation of the annular channel. In one advantageous type of securing of the guide blades at the support sleeve, there is used according to the present invention an annular disc which serves with the known axle drives of the aforementioned type for the axial fastening of the hollow gear at the support sleeve. According to the present invention, the radial disc is provided with radial support plates and the support plates are provided with flow apertures or passages for the guide blades, whereby the average streamlines of a respective flow aperture or passage of the annular disc or of the support sleeve are disposed in a common plane through the axis of rotation of the annular channel.

For the purpose of advantageous fastening of the guide blades at the annular disc, the guide blades are axially delimited according to the present invention by end faces with plane parallel surfaces and the end faces of larger cross section are welded to the support plates of the annular disc whereby the contact surfaces of two guide blades symmetrically placed against one another are disposed in the common plane of the streamlines of the associated flow passage or aperture.

In order to avoid oil obstructions inside of the guide blades independently of the direction of flow within the annular channel, according to a further feature of the present invention, the legs of the guide blades placed against one another are cut off at their ends facing the support plates at an acute angle with respect to the support plate. A free flow cross section results therefrom between two guide blades belonging to a flow aperture or passage at the support bush or sleeve.

It is furthermore known with axle drives of the aforementioned type that one planetary gear each is arranged axially within the area of a wheel rim and the associated wheel hub is nonrotatably connected with a rim flange and includes a hub portion whose average diameter is considerably smaller than the internal diameter of the rim flange. In the application of the present invention to an axle drive of the last-described type, an advantageous arrangement and construction of the annular channel results in accordance with the present invention by a flange-tube, nonrotatably connected with the housing cover of the oiltight housing and with the rim flange, whose outer or inner diameter is approximately equal to the internal diameter of the rim flange. The flange-tube thereby forms the housing case of the oiltight housing, and an annular channel with a relatively large flow cross section results thereby between the flange-tube and the hub portion. An optimum cooling surface for the annular channel is obtained by the large flange-tube diameter. Furthermore, as a result of the arrangement according to the present invention of a flange-tube between planetary gear carrier and rim flange, the wheel hub is relieved from the driving torques of the axle drive whereby the type of construction of the wheel hub is simplified. According to a still further advantageous construction of the present invention, the latter is characterized by a common flanged connection between wheel rim, flange-tube and wheel hub whereby an oil seal is provided between the flange of the flange-tube and the hub flange.

Accordingly, it is an object of the present invention to provide an axle drive, especially for motor vehicles, which avoids by simple means the aforementioned shortcomings and drawbacks encountered in the prior art by extremely simple and effective means.

Another object of the present invention resides in an axle drive of the type described above which assures continuous lubrication of the planetary gear at all driving speeds.

A further object of the present invention resides in an axle drive provided with an annular channel in which the lubricating oil is not only effectively cooled by the annular channel but is supplied to the engaging zones of the planetary gear in a relatively calm condition.

Still a further object of the present invention resides in an axle drive with forced oil circulation through the planetary gear which avoids undesirable splash work of the oil within the gear area, properly speaking.

Still another object of the present invention resides in an axle drive in which an operationally reliable and sufficient lubrication of the planetary gear is assured regardless of whether the vehicle drives in the forward or backward direction.

Another object of the present invention resides in an axle drive with planetary gear of the type described above which permits far-reaching simplification in the construction and assembly of the various parts.

Figure 2:
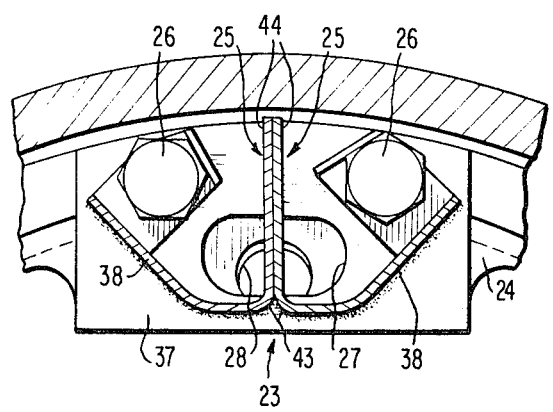

These and further objects, features, and advantages of the present invention will become more obvious from the following description when taken in connection with the accompanying drawing which shows, for purposes of illustration only, one embodiment in accordance with the present invention, and wherein:

FIG. 1 is a partial longitudinal cross-sectional view through an axle drive in accordance with the present invention; and FIG. 2 is a cross-sectional view, on an enlarged scale, through the guide apparatus in accordance with the present invention, taken along line II-II of FIG. 1.

Referring now to the drawing wherein like reference numerals are used throughout the two views to designate like parts, and more particularly to FIG. 1, in the axle drive illustrated in this figure, the sun gear 2 is nonrotatably arranged on the outer end of the driving half-axle-shaft 1 as input member of a planetary gear assembly generally designated by reference numeral 3. The sun gear 2 is in meshing engagement with the planet wheels 4 which are rotatably supported on a two-partite planetary gear carrier 5 by means of radial needle bearings 6. The planet gears 4 mesh with a hollow or internal ring gear 7 which is nonrotatably connected by way of a flangelike support sleeve or bush 8 with the axle tube 9 and forms the reaction member of the planetary gear 3. The planet gear carrier 5 is constructed at the end face in the form of a housing cover 10 which is nonrotatably connected by way of bolts 11 with a flange-tube 12. The flange-tube 12 forms the housing case of an oiltight housing generally designated by reference numeral 13 within which is arranged the planetary gear assembly 3. The flange-tube 12 includes a flange 41 and is secured by way of the latter by means of bolts 14 at a rim flange 39 of the wheel rim 15. Furthermore, a wheel hub generally designated by reference numeral 16 is nonrotatably connected by means of bolts 14 with the wheel rim 15 by way of a hub flange 40 whereby the wheel hub 16 is rotatably supported with its hub portion 42 on the axle tube 9 by means of conical roller bearings 17. The hub portion 42 of the wheel hub 16 has an average diameter which is considerably smaller than the internal diameter of the rim flange 39. The wheel hub 16 is sealed in an oiltight manner by means of a set of seals or packings 18 of any conventional construction with respect to the outer surface of the axle tube 9. The flange-tube 12 and the wheel hub 16 enclose an annular channel 19 and are sealed with respect to each other by a seal 20.

As can be seen from FIG. 1, the oiltight housing 13 essentially consists of the housing case or flange-tube 12, of the housing cover 10 and of the wheel hub 16 which are driven as rotating housing unit by way of the planet gear carrier 5.

The approximately rectangularly shaped cross section of the annular channel 19 is defined on three sides thereof by the flange-tube 12, the hub portion 42 and the hub flange 40 and is delimited with respect to the planetary gear 3 by the support sleeve or bush 8. The annular channel 19 is in communication with radially outwardly disposed engaging zones generally designated by reference numeral 21 of the planetary gear assembly 3 by way of an annular gap 22 between the flange-tube 12 and the hollow gear 7.

For purposes of achieving an approximately centripetal flow, a fixed guide apparatus generally designated by reference numeral 23 (FIG. 2) is provided on a side of the annular channel 19 which consists essentially of an annular disc 24 and of guide blades 25. The annular disc 24 is secured at its end face at the hollow gear 7 by means of bolts 26 and serves simultaneously for fastening the hollow wheel 7 at the support sleeve 8.

Within the area of the guide blades, flow apertures 27 and 28 are provided in the annular disc 24 and in the support sleeve 8, respectively, for the connection or communication of the annular channel 19 with the part of the oiltight housing 13 on the side of the gear. The average streamlines of the mutually associated flow apertures 27 and 28 are disposed in a common plane through the axis of rotation of the annular channel 19. The flow apertures 27 in the annular disc 24 are each controlled by a respective pair of axially symmetrical guide blades 25 which are secured symmetrically to the aforementioned plane of the streamlines at a radial support plate 37 of the annular disc 24. Each guide blade 25 has a tapering, unequalsided angular profile in cross section that is formed by a shorter leg portion 44 and a longer leg portion 38. The longer leg portion 38 is thereby curved in the direction toward the shorter leg portion 44. In the installed position, two guide blades 25 each are placed against one another with the shorter leg portions 44 thereof whereby the profile ends of the shorter and of the longer leg portions 44 and 38 are respectively disposed on similar flow radii within the annular channel 19. The common profile edge 43 of the two leg portions 44 and 38 of a respective guide blade 25, thereby forms an acute angle with the axis of rotation of the annular channel 19. The axial ends of a respective guide blade 25 are constructed as end faces with parallel surfaces of which the end faces of larger cross section are welded to the support plate 37 of the annular disc 24. The leg portions 44 of a respective guide blade pair placed against one another are cut off at their ends facing the support plate 37 at an acute angle $x$ with respect to the support plate 37.

For purposes of avoiding disadvantageous flow turbulences, the cross section of the support sleeve 8 is provided within the area of the flow apertures 28 with flow guide surfaces 29 and 30 on the side of the gear and on the side of the channel.

The planet wheels 4 are supported at the planet gear carrier 5 on bolts 31 which are provided with axial bores 32 for the supply of the needle bearings 6 with lubricating oil. A guide disc 33 is secured by means of bolts 34 to the planet gear carrier 5 at the end face thereof. The guide disc 33 is offset in a Z-shaped manner with respect to the planet gear carrier 5 within an area radially outwardly of the oil bores 32 and covers the axial bores 32 with an axial distance. The guide disc 33 is provided with a concentric flow aperture 35 into which immerse or extend guide cross sections 36 constructed at the support sleeve 8 for the deflection of the oil stream.

With a rotating housing 13, the lubricant is supplied from the engaging zones of the planetary gear 3 disposed radially inwardly at the sun gear 2 by the meshing engagement of the planet gears 4 toward the engaging zones 21 disposed radially outwardly at the hollow gear 7 into the annular gap 22, and on the other, by the centrifugal force effect in bypassing relationship to the planetary gear assembly 3 also by way of the annular gap 22 into the annular oil channel 19.

Under the influence of the guide blades 25, a flow component of the oil rotating within the oil channel 19 is guided through the apertures 27 and 28 at the support sleeve 8 into the annular space between the guide disc 33 at the planet gear carrier 5 and the support sleeve 8. The oil flows within this annular space in an approximately centripetal direction and is again supplied to the radially inwardly disposed engaging zones at the sun gear 2 by the deflecting effect of the guide cross sections 36 at the support sleeve 8.

In the adjacent annular space between guide disc 33 and the end surface of the planet gear carrier 5 facing the same, the oil flows again radially outwardly under the effect of the centrifugal force and is deflected by the guide disc 33 coaxially toward the oil bores 32 and is thus supplied to the needle bearings 6.

While we have shown and described only one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are within the scope of those skilled in the art.

We claim:

1. An axle drive, especially for motor vehicles, in which a half-axle drive shaft is operatively connected with the input member of a planetary gear assembly and the wheel hub of the associated vehicle wheel with the output member thereof, comprising an oiltight housing in which the planetary gear assembly is arranged, said oiltight housing having a housing case rotatably driven by the planetary gear assembly, the reaction member of which is rigidly connected within the oiltight housing with a relatively rigid, nonrotatable part of the axle drive housing, characterized by annular channel means being provided within the oiltight housing, said annular channel means being radially delimited by the housing case and spatially separated from the planetary gear assembly, said planetary gear assembly having radially outwardly disposed and radially inwardly disposed engaging zones, first flow passage means providing a communication between said annular channel means and said radially outwardly disposed engaging zones, and relatively fixed guide means for the annular channel means including guide blade means on a side of the annular channel means for producing an approximately centripetal flow component independent of the direction of rotation of the housing case and guide-deflecting means formed by guide cross sections the side of the planetary gear assembly for deflecting the approximately centripetal flow component in the direction toward the radially inwardly disposed engaging zones.

2. An axle drive according to claim 1, wherein said guide means is nonrotatably connected with a part securely connected with the reaction member of the planetary gear assembly.

3. An axle drive according to claim 1, wherein said guide means is operatively connected with the reaction member of the planetary gear assembly to rotate in unison therewith.

4. An axle drive according to claim 3, in which the axle drive housing includes an axle tube means, flangelike support sleeve means connecting the reaction member of the planetary gear assembly nonrotatably with the axle tube means, the annular channel means being arranged on the side of the flangelike support sleeve means opposite the planetary gear assembly, and the support sleeve means forming an axial boundary for the annular channel means.

5. An axle drive according to claim 4, wherein the flangelike support sleeve means is provided with second flow passage means connecting the annular channel means with the engaging zones of the planetary gear assembly, and a pair of substantially axially symmetrical guide blade means for controlling each second flow aperture means on the side of the support sleeve means facing the annular channel means, said pair of axially symmetrical guide blade means being securely connected with the support sleeve means.

6. An axle drive according to claim 5, wherein the cross section of the support sleeve means is delimited within the area of the second flow passage means by flow guide surface means on the side of the planetary gear assembly and on the side of the channel means.

7. An axle drive, especially for motor vehicles, in which a half-axle drive shaft is operatively connected with the input member of a planetary gear assembly and the wheel hub of the associated vehicle wheel with the output member thereof, comprising an oiltight housing in which the planetary gear assembly is arranged, said oiltight housing having a housing case rotatably driven by the planetary gear assembly, the reaction member of which is rigidly connected within the oiltight housing with a relatively rigid, nonrotatable part of the axle drive housing, characterized by annular channel means formed within the oiltight housing, said annular channel means being radially delimited by the housing case and constructed spatially separated from the planetary gear assembly, said planetary gear assembly having radially outwardly disposed and radially inwardly disposed engaging zones, first flow passage means providing a communication between said annular channel means and said radially outwardly disposed engaging zones, and relatively fixed guide means for the annular channel means including guide blade means on a side of the annular channel means for producing an approximately centripetal flow component and guide-deflecting means on the side of the planetary gear assembly for deflecting the approximately centripetal flow component in the direction toward the radially inwardly disposed engaging zones.

8. An axle drive according to claim 7, in which the axle drive housing includes an axle tube means, flangelike support sleeve means nonrotatably connecting the reaction member of the planetary gear assembly with the axle tube means, the annular channel means being arranged on the side of the flangelike support sleeve means opposite the planetary gear assembly, and the support sleeve means forming an axial boundary for the annular channel means.

9. An axle drive according to claim 8, wherein the flangelike support sleeve means is provided with second flow passage means connecting the annular channel means with the engaging zones of the planetary gear assembly, and a pair of substantially axially symmetrical guide blade means for controlling each second flow aperture means on the side of the support sleeve means facing the annular channel means, said pair of axially symmetrical guide blade means being securely connected with the support sleeve means.

10. An axle drive according to claim 9, wherein the cross section of the support sleeve means is delimited within the area of the second flow passage means by flow guide surface means on the side of the planetary gear assembly and on the side of the channel means.

11. An axle drive according to claim 8, in which each planet gear assembly includes a planet gear carrier and planet gear wheels with bearing-support means operatively associated therewith, substantially axial oil bore means being provided at each planet gear carrier for the planet gear wheel bearing-support means, and further guide means arranged at the planet gear carrier within an area of the axial bore means thereof which deflects a radial component of an oil stream substantially coaxially toward the respective oil bore means.

12. An axle drive according to claim 11, wherein the guide blade means have a tapering, unequalsided angular profile in cross section whose longer leg portion is curved in the direction toward the shorter leg portion, two guide blade means each being placed in the assembled position substantially symmetrically against one another with the shorter leg portions thereof, the profile ends of the same types of leg portions being disposed along similar flow radii, on the one hand, and the common profile edge of the two leg portions of a respective guide blade means forming an acute angle with the axis of rotation of the annular channel means, on the other.

13. An axle drive according to claim 7, in which each planet gear assembly includes a planet gear carrier and planet gear wheels with bearing-support means operatively associated therewith, substantially axial oil bore means being provided at each planet gear carrier for the planet gear wheel bearing-support means, and further guide means arranged at the planet gear carrier within an area of the axial bore means thereof which deflects a radial component of an oil stream substantially coaxially toward the respective oil bore means.

14. An axle drive according to claim 13, wherein said further guide means includes guide disc means flangedly connected to the planet gear carrier at the end face thereof which if offset from the planet gear carrier radially outwardly of the oil bore means in a substantially Z-shaped manner and which covers the oil bore means at an axial distance, said guide disc means being also provided with a substantially concentric flow aperture for the oil stream, the guide cross sections at the deflecting means on the side of the gear extending into the concentric flow aperture of the guide disc means with radial play.

15. An axle drive according to claim 7, wherein the guide blade means have a tapering, unequalsided angular profile in cross section whose longer leg portion is curved in he direction toward the shorter leg portion, two guide blade means each being placed in the assembled position substantially symmetrically against one another with the shorter leg portions thereof, the profile ends of the same types of leg portions being disposed along similar flow radii, on the one hand, and the common profile edge of the two leg portions of a respective guide blade means forming an acute angle with the axis of rotation of the annular channel means, on the other.

16. An axle drive according to claim 15, in which the planetary gear includes a hollow gear and in which an annular disc means is flangedly connected at the hollow gear assembly of the planetary gear for the axial fastening thereof with a support means, the annular disc means having radial support plate means and the support plate means being provided with third flow passage means for the guide blade means, the average streamlines of respective second and third flow passage means at the annular disc means and at the support means being disposed in a common plane through the axis of rotation of the annular channel means.

17. An axle drive according to claim 16, wherein the leg portions of the guide blade means placed against one another are cut off at the ends facing the support plate means at an acute angle with respect to the support plate means.

18. An axle drive according to claim 16, wherein the guide blade means are axially delimited by end faces with parallel surfaces and the end faces of larger cross section are rigidly connected to the support plate means of the annular disc means, the contact surfaces of two guide blade means symmetrically placed against one another being disposed in the common plane of the streamlines of the associated flow passage means.

19. An axle drive according to claim 18, wherein the leg portions of the guide blade means placed against one another are cut off at the ends facing the support plate means at an acute angle with respect to the support plate means .

20. An axle drive according to claim 7, wherein the planetary gear is arranged axially within the area of a wheel rim having a rim flange, and wherein the associated wheel hub is nonrotatably connected with the rim flange of the corresponding wheel rim and includes a hub portion whose average diameter is considerably smaller than the internal diameter of the rim flange, said oiltight housing including a housing cover means and flange-tube means, said flange-tube means being nonrotatably connected with said cover means and with the rim flange, the diameter of said flange-tube means being approximately equal to the internal diameter of the rim flange.

21. An axle drive according to claim 20, in which the wheel hub includes a hub flange approximately matched in its radial dimension to the rim flange, common flange-connecting means between the wheel rim, the flange-tube means, and the wheel hub, and seal means between the flange of the flange-tube means and the hub flange.